United States Patent Office 2,795,533
Patented June 11, 1957

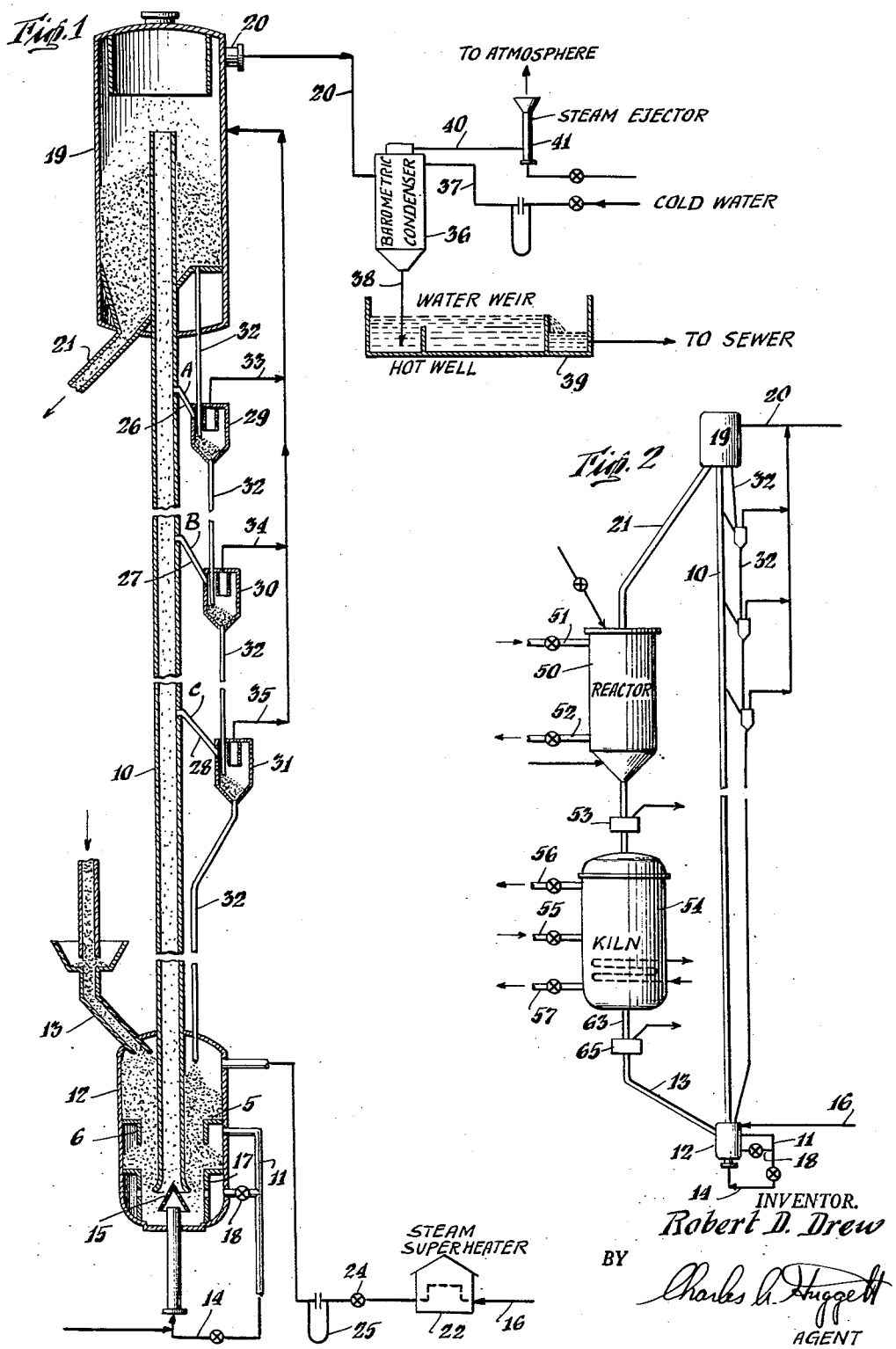

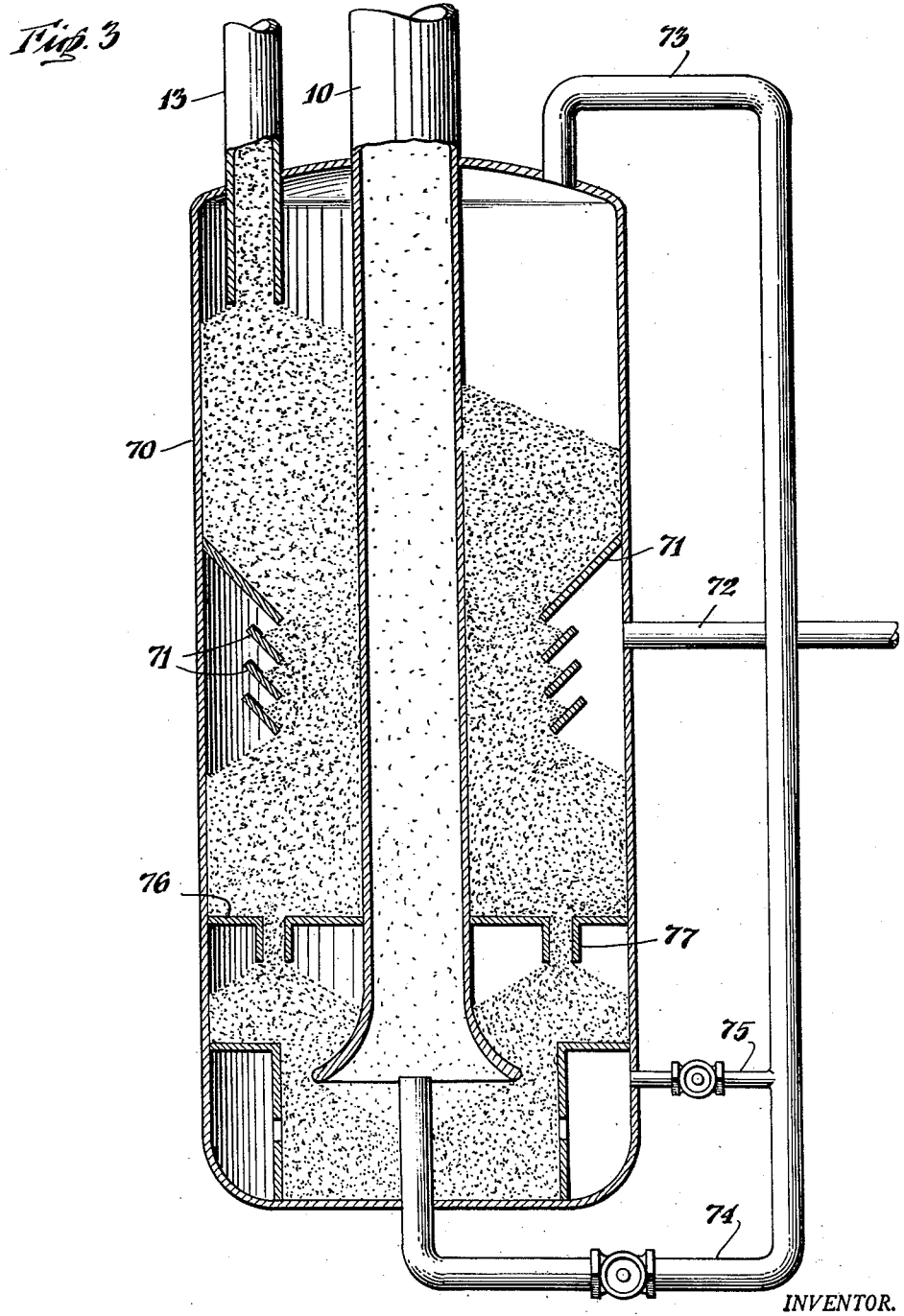

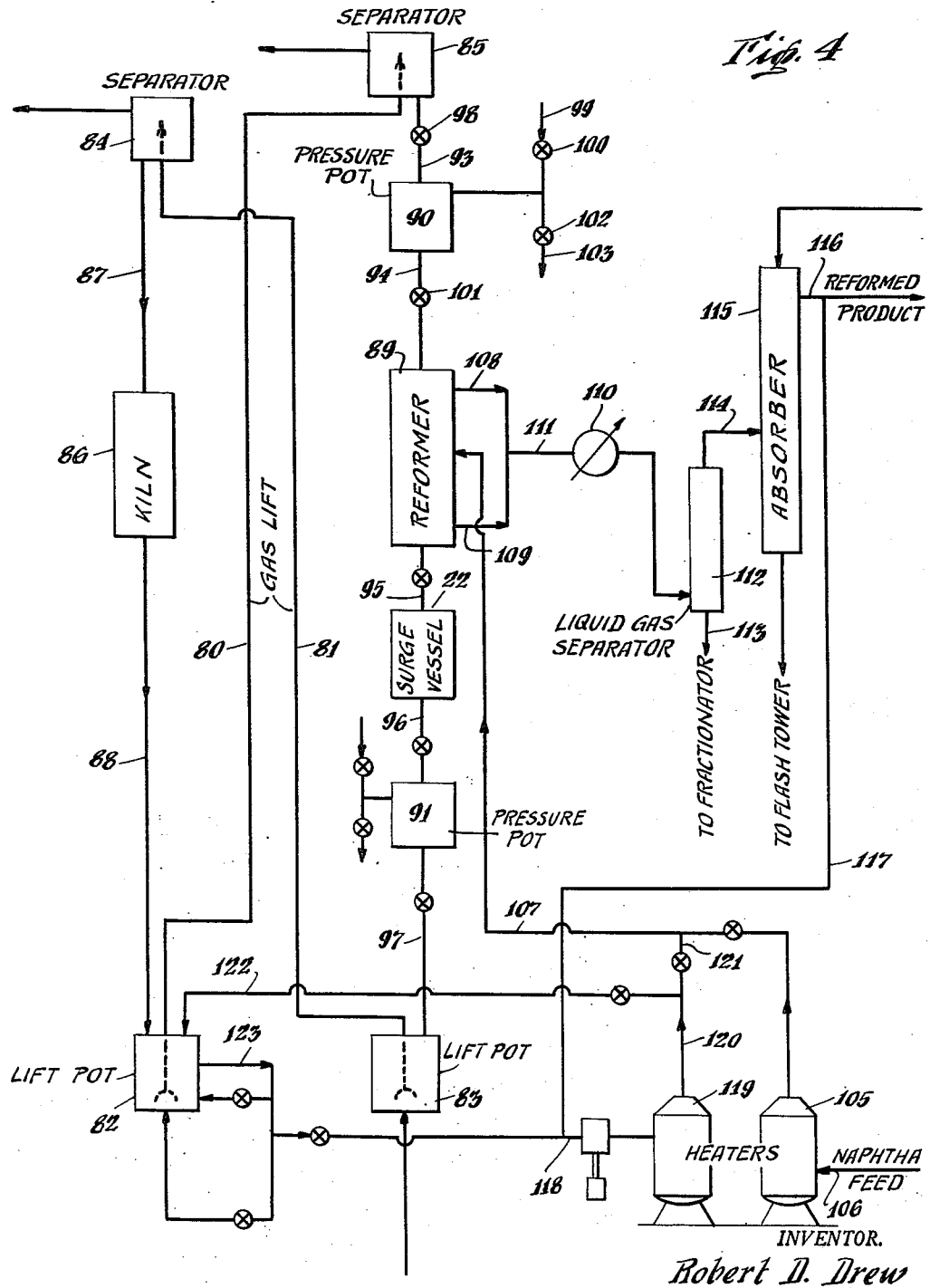

2,795,533

HYDROCARBON CONVERSION PROCESS AND APPARATUS THEREFOR

Robert D. Drew, Wenonah, N. J., assignor to Socony Mobil Oil Company, Inc., a corporation of New York Application March 18, 1952, Serial No. 277,146

13 Claims. (Cl. 196—50)

This invention is directed to continuous hydrocarbon conversion processes which utilize moving masses of granular contact material. It is more particularly directed to improvements in continuous hydrocarbon conversion systems which use gas lifts for upward transfer of the solid contact material.

There are a variety of processes which utilize moving masses of solids as a catalytic or heat transfer medium, such as hydrogenation, cyclization, desulfurization, dehydrogenation and catalytic cracking of hydrocarbons. A preferred system incorporates reaction and regeneration vessels in which granular solids are gravitated downwardly as substantially compact columns and solids are transferred from the bottom of one vessel to the top of the other to complete an enclosed cyclic path. Hydrocarbons are passed continuously through the solids bed in the reaction vessel and air is passed through the solids bed in the regeneration vessel to burn off carbonaceous deposits picked up by the solids in the conversion vessel.

A variety of substances have been used as the granular solid material in these processes. For example, natural or treated clays, such as bauxite or kaolin are used or synthetics, such as alumina, silica, alumina-silica. These materials are used in catalytic cracking in a size range of about 3–60 mesh broadly, and preferably about 4–10 mesh, Tyler Standard Screen Analysis. In other processes, other sizes may be used. For instance, when the particles are non-catalytic, merely serving as a heat carrier, it is found desirable to use larger particles. The shape of the particles may be in the form of pellets, pills or spheres of substantially uniform shape or they may be of irregular non-uniform shape.

It has been customary in prior processes to lift the catalyst or contact material from the bottom of one vessel to the top of the other by means of continuous bucket elevators. These elevators have some undesirable physical limitations and, therefore, efforts have been made to provide suitable pneumatic lifts adapted for lifting the granular catalyst at a smoothly controlled rate without serious fracture of or damage to the particles in transit. In copending application for Letters Patent Serial Number 210,942 filed February 14, 1951, now Patent No. 2,770,-804, a suitable lift and method of lifting granular solids is disclosed. It is there shown that the successful lifting of the catalyst through an elongated lift pipe depends upon precise control of the catalyst velocity as it enters the lift, as it passes through the body of the lift, and also as it is discharged from the top thereof. The catalyst must be rapidly accelerated at the bottom of the lift between critical limitations and must be maintained above a critical minimum velocity in the main body of the lift pipe to prevent surging in the pipe with consequent high catalyst attrition. The discharge velocity of the catalyst at the top of the pipe must be carefully controlled to prevent high catalyst attrition at that point.

The precise control required in the gas lift to prevent surging and high catalyst attrition can only be maintained by controlling the gas flow, gas temperature, catalyst temperature and other related factors within narrow limits. Copending application for Letters Patent Serial Number 226,646, filed May 16, 1951, now Patent No. 2,726,122, describes in more detail suitable method and apparatus for effecting this control, necessary for successful operation of the lift. It is there disclosed that the lift gas must be heated to a temperature reasonably close to that of the catalyst so that there will not be any substantial amount of heat exchange between the catalyst and gas in the lift pipe. The catalyst is maintained at a high temperature in transit because the reaction and regeneration occurs most favorably at high temperature and it would be uneconomical to cool the contact material between the vessels. It is expensive to provide the heat necessary to raise the gas temperature, and difficult to provide the precise control of this temperature that is required. It is an aim of this invention to provide a lift which effects this heating simply and economically and provides smooth transfer of the catalyst.

The object of this invention is to provide method and apparatus which overcomes the difficulties above enumerated formerly encountered in the pneumatic transfer of granular solids.

It is a further object of this invention to provide method and means of pneumatically transferring smoothly and continuously the granular contact material with minimum surging and attrition.

It is a further object of this invention to provide a simple and economical method and means of pneumatically lifting granular catalyst in a hydrocarbon cracking system.

These and other objects will be made more apparent by the following detailed description of the invention and the attached drawings.

Figure 1 is a vertical section of a pneumatic lift shown in cross-section.

Figure 2 is a diagrammatic showing of a continuous hydrocarbon conversion system.

Figure 3 is an enlarged sectional view of the lower portion of a pneumatic lift, which illustrates an alternate embodiment of the invention.

Figure 4 is a diagrammatic showing of a hydrocarbon reforming system.

In the catalytic cracking of petroleum to produce increased yields of motor gasoline, which is illustrative of these hydrocarbon conversion processes, the reaction zone is maintained between about 800–1100° F. and the regeneration zone is maintained between about 1000–1300° F. The catalyst removed from the bottom of the kiln may be about 900–1000° F. Referring to Figure 1, this hot granular material is transferred downwardly as a substantially compact gravitating column through the conduit 13 into the upper portion of the feeding vessel 12. The conduit 13 is made long enough to substantially minimize gas transfer upward or downward through the column. In the preferred form of the invention, the catalyst is vented to the atmosphere through a vent box 9. The particles gravitate downwardly through the vessel 12 as a substantially compact mass.

A vertically elongated lift passageway or lift pipe 10 is projected at its lower end into the top of the feeding vessel 12 and is terminated near the bottom of the vessel. The pipe 10 is centrally located in the vessel 12, so that the catalyst gravitates around the pipe to a location beneath the open end of the pipe. The conduit 13 is projected into the vessel 12 providing a particle-free region in the top of the vessel. A lift gas, such as steam, may be introduced into the pipe 16, superheated in the steam superheater 22 and introduced into the top of the vessel. The valve 24 serves to control the flow rate of the steam. The steam travels downwardly through the bed in concurrent flow with the catalyst. The horizontal plate 5 and depending skirt baffle 6 direct the catalyst through a restricted annular passageway and provide a particle-free region for the withdrawal of the steam from the bed. The plate and skirt baffle are located intermediate the top and bottom of the vessel, providing a fixed volume of catalyst for contact with steam thereabove. The steam is heated in contacting the hot catalyst and the catalyst is cooled, so that their temperatures are brought substantially together by the heat interchange. The heated steam is withdrawn through the conduit 11 and split into two streams in conduits 18 and 14. The primary stream is introduced into the bottom of the gas lift pipe 10 in an upward direction. The pipe 14 is terminated near the bottom of the lift pipe, so that the gas enters the lift pipe without passing through any substantial thickness of the catalyst bed. The conical screen 15 projects into the lower end of the lift pipe. The secondary gas is introduced by the conduit 18 into a manifold 17 located in the form of a horizontal ring in the bottom of the vessel 12. The gas is introduced into the catalyst bed through orifices in the manifold spaced about the lift pipe, so that the gas passes through a substantial thickness of the catalyst bed before entering the lift passageway.

The flow rate of the primary gas is adjusted to give the proper gas flow rates in the pipe. The flow rate of the secondary gas is adjusted to effect the desired catalyst circulation rate, being normally about 5–15 percent of the flow of primary gas. By this procedure the catalyst is properly accelerated in the bottom of the lift pipe and maintained above surging velocity in the pipe during transit. Any temperature differential between the catalyst and lift gas causes heat transfer between the gas and solids with a resultant change in gas and catalyst velocity in the pipe. This undesirable feature is avoided by this invention. The solids and lift gas are in heat exchange relationship in the upper portion of the feeding vessel and hence enter the lift pipe at about the same temperature. The catalyst velocity may be too high for the top of the lift, however. It has been found desirable to reduce the velocity of the catalyst discharged from the top of the lift in the upper portion of the lift pipe. This can be done, as illustrated, by withdrawing gas at spaced points along the pipe, such as A, B, and C. The catalyst is discharged from the top of the pipe 10 into the enlarged separator 19 where gas-solids separation occurs. The catalyst forms a compact mass around the pipe in the bottom of the vessel and is carried downwardly through the conduit 21 to processing apparatus.

A small amount of catalyst escapes from the pipe with the withdrawn gas through the outlets A, B and C. This is recovered from the gas by the separators 29, 30, 31 and carried downwardly in the continuous stream of catalyst in the conduit 32 to the top of the feeding vessel. The gas from the separators is introduced into the main lift separator 19 by the conduits 33, 34 and 35. When steam is used as the lift gas it is withdrawn from the top of the separator 19 through the conduit 20 to the barometric condenser 36. Cold water is sprayed into the condenser 36 through the conduit 37 and the water is discharged from the bottom of the condenser through the conduit 38 to the hot well 39. In some instances it is desired to operate the separator 19 at a reduced pressure. This can be effected by withdrawing gas from the condenser 36 through the conduit 40. A steam ejector 41 is used to apply vacuum to the condenser.

Referring to Figure 2, the gas lift is shown incorporated in a moving bed cracking system. A single lift is used with the reaction vessel superimposed over the regeneration vessel or kiln. The catalyst is drawn downwardly as a continuous column through the elongated feed leg 21 into the top of the reactor 50. The reactor is often operated at pressures higher than that in the separator 19 and the feed leg is made long enough and designed to effect smooth feeding into the vessel against the advanced pressure. A suitable design is shown and claimed in United States Letters Patent 2,410,309, which issued on October 29, 1946. Reactant gases or liquids are charged into the reactor through the conduit 51 and converted products are withdrawn through the conduit 52. Spent catalyst is withdrawn from the bottom of the reactor and may be depressurized in the vessel 53 before being introduced into the kiln 54. Combustion supporting gas, such as air, is introduced into the kiln 54 through the conduit 55 and travels both upwardly and downwardly through the substantially compact bed, burning the carbonaceous material from the surface of the particles. The flue gas is withdrawn from the vessel through the conduits 56, 57 to a stack not shown. Suitable amounts of inert sealing gas can be used at the top and bottom of the vessels to localize the reactions being carried on in the separate vessels. The hot catalyst, at a temperature in the neighborhood of 1000° F. is withdrawn from the bottom of the kiln through the conduit 13 to the top of the feeding vessel 12.

Referring now to Figure 3, an alternate embodiment of the invention is shown. The catalyst is introduced into the top of the feeding vessel 70 through the conduit 13 to form a substantially compact moving mass therein. A series of dish-shaped baffles 71 is located in the mid portion of the vessel 70 with the top baffle being extended outwardly to the inner wall of the vessel 70 to provide a catalyst-free area thereunder. A lift gas is introduced into the vessel 70 through the conduit 72. The gas enters the catalyst column as the column passes through the baffles 71. The gas passes upwardly in countercurrent flow with the descending catalyst and is withdrawn from the top of the vessel through the conduit 73. The lower end of the conduit 13 is projected into the vessel 70 to provide a catalyst free area in the top of the vessel which permits ready separation of the gas from the bed. The lift gas is split into primary and secondary streams, and reintroduced into the vessel through the conduits 74, 75. A horizontal plate 76 with depending conduits 77 is located below the baffles 71 but above the lower end of the lift pipe 10. This arrangement prevents the downward transfer of any substantial portion of the lift gas in the gravitating bed.

If steam is used as the lifting medium there is a pronounced tendency on the part of the hot catalyst to take up steam in the lift pipe as "hydration steam." This results in a decreasing gas and catalyst velocity caused by the continuous removal of steam from the lift. If the discharge velocity of the gas is high enough to bring the catalyst discharge velocity within the desired range, the gas velocity will be too high in the lower portion of the lift. Excessive velocity in the lower portion of the lift has been found to cause high catalyst breakage or attrition. It has been proposed to hydrate the catalyst in the bottom of the kiln, but this method has an inherent disadvantage in that catalyst is in contact with the steam an excessive period of time. This causes serious damage to the catalyst. It is difficult to avoid excessive contacting in the kiln because of the large cross-sectional area of the kiln, and the necessity for using a draw-off system which includes a large volume of catalyst.

In this invention the upper portion of the lifting vessel provides a suitable location where controlled amounts of steam and catalyst can be brought into contact with each other to hydrate the catalyst as well as to provide heat exchange therebetween. By this procedure, low pressure, low temperature steam can be used as the lifting medium and be brought up to operating temperature by the excess heat of the catalyst. Sufficient steam is supplied to the upper portion of the feeding zone to hydrate the fixed volume of catalyst in the upper portion of the feeding vessel. The cross-section of the vessel is made uniform from top to bottom to effect even distribution of the steam through the bed to provide uniform hydration of the material. Excess steam is then supplied in an amount necessary for properly lifting the particles through the gas lift. It is seen that in addition to providing smooth transfer of the catalyst particles through the lift pipe, this invention effects a substantial economy by using waste heat to superheat the lift gas to desired operating temperature and also provides a simple method of effecting the control of temperature of the lift gas and particles so necessary for smooth transfer of the granular material.

It is preferred to remove all the lift gas after it is preheated before splitting it into primary and secondary streams. However, by proper design of the feeding vessel, a controlled amount of the gas can be directed downwardly through the bed to the lift pipe to serve as secondary lift gas. The remainder of the lift gas can be removed from the bed as previously described and utilized as the primary lift gas.

When using steam as the lift gas, the volume of the upper portion of the feeding vessel must be such that the residence time of the catalyst in contact with the steam is sufficient to effect the hydration of the catalyst. The residence time may be broadly between about 0.1–10 minutes or preferably between 0.25–5 minutes and more preferably about 0.5 minute. By limiting the time of contact of the catalyst with the steam in the upper portion of the feeding vessel, the poisonous effects of excessive steam contacting are avoided.

As an illustration of this invention the following example covering the use of a steam lift in a moving bed cracking system is given:

*Example I*

| | |
|---|---|
| Catalyst material | Clay |
| Size range of catalyst | 4–10 mesh, Tyler |
| Catalyst circulation rate_____T./hr__ | 360 |
| Temperature of catalyst at top of feeding vessel °F__ | 915 |
| Flow rate of lift gas introduced into vessel lbs./hr__ | 40,900 |
| Steam for lifting—33,000 lbs./hr. | |
| Steam for hydration—7,900 lbs./hr. | |
| Temperature of lift gas introduced into vessel °F__ | 400 |
| Temperature of lift gas after withdrawn from middle feeding vessel_____°F__ | 1,000 |
| Temperature of catalyst in bottom of feeding vessel _____°F__ | 1,000 |
| Percentage of lift gas used as primary gas_____ | 90 |
| Percentage of lift gas used as secondary gas_____ | 10 |
| Height of lift pipe_____feet__ | 234 |
| Diameter of lift pipe at bottom_____in__ | 25⅝ |
| Diameter of lift pipe at top_____in__ | 39 |
| Gas velocity at bottom of lift pipe_____F. P. S__ | 148 |
| Catalyst equil. velocity at bottom of lift pipe F. P. S__ | 87 |
| Gas velocity at middle of lift pipe_____F. P. S__ | 124 |
| Catalyst equil. velocity at middle of lift pipe F. P. S__ | 61 |
| Gas velocity at top of lift pipe_____F. P. S__ | 73 |
| Catalyst equil. velocity at top of lift pipe F. P. S__ | 8 |
| Diameter of feeding vessel_____feet__ | 8.0 |
| Height of feeding vessel_____do____ | 8.7 |
| Distance from top of vessel to horizontal partition plate _____feet__ | 5.7 |
| Distance from bottom of vessel to bottom of lift pipe _____foot__ | 1 |
| Residence time of catalyst in contact with steam min__ | 1 |

The invention covers broadly:

1. The contacting of lift gas with gravitating contact material at a temperature substantially different from that of the contact material and in a confined feeding zone separated from the reaction or regeneration zone by a compacted column of solids of sufficient length to prevent transfer of any substantial amount of gas between the zones and the use of the gas after contact with the solids to effect the lifting of the solids through an upwardly confined lift passage. The heat exchange between the gas and solids may be effected to raise the temperature of the lift gas or decrease the temperature of the solids. The heat exchange in the feeding zone may be used to effect a heat balance in a continuous hydrocarbon conversion system. In a cracking system this may involve extracting heat from the solids after passage through a regeneration zone and before introduction into a reaction zone. In a reforming process of the continuous moving bed type, this may involve adding heat to the solids after passage through a reconditioning zone and before introduction into a reaction zone.

2. The controlled hydration of the hot solids. This is done primarily when steam is used as the lifting gas and applies more particularly to natural catalytic material than to synthetic catalytic material. The natural catalysts take up substantially greater amounts of steam as "hydration steam" after being dried in a dry hot atmosphere such as in the regeneration zone. Normally, the spent contact material from the reaction zone is already hydrated and, therefore, the hydration aspect has more application to the contact material removed from the kiln.

3. The contacting of gas with solid contact material in a feeding zone prior to using the gas to effect the lifting of the solid contact material to both hydrate the particles and effect heat exchange between the solids and the gas.

Referring now to Figure 4, the invention is shown applied to a continuous moving bed reforming process. Lift pipes 80, 81 are shown in side-by-side relationship connecting with feed vessels 82, 83 at their lower ends and separators 84, 85 at their upper ends. Between the separator 84 and feeding vessel or lift pot 82 is located a kiln 86 and connecting conduits 87, 88. Between the separator 85 and lift pot 83 is located the reformer 89, pressure pots 90, 91 surge vessel 92 and connecting conduits 93, 94, 95, 96 and 97 in addition to the necessary valves to provide a vertical series passage for the contact material.

In reforming operations, solid contact material is gravitated downwardly from the separator 84 through the conduit 87, kiln 86, and conduit 88 to the lift pot 82 as a substantially continuous column of particles. The kiln is operated at substantially atmospheric pressure and, therefore, no valving is needed in the column. A combustion supporting gas is passed through the column in the kiln to effect combustion of carbonaceous material on the surface of the particles. The particles are gravitated downwardly from the kiln to the lift pot 82. The particles are conveyed upwardly through the lift pipe 80 by means of gas flow and the gas and particles are separated in separator 85. The solids are gravitated downwardly through the conduit 93 at periodic intervals when the valve 98 is opened and flow into the pressure pot 90. The valve 93 is then closed and the valve 100 is opened to introduce a gas into the pressure pot 90 through the conduit 99, a pressurizing gas. When the pressure in the pot 90 is about equal to the pressure in the reformer 89 the valve 101 is opened and the solid contact particles flow into the vessel 89. The valves 101 and 100 are then closed and the valve 102 is opened to allow the gas to escape from the pot 90 through the conduit 103. When the pressure in the pot 90 is reduced to the pressure in the separator 85, the valve 98 is opened allowing the pot 90 to refill. Solids are similarly depressurized in pressure pot 91 after removal from the bottom of the reformer and gravitated downwardly through the conduit 97 to the lift pot 83. A lift gas is introduced into the lift pot 83 through the conduit 104 to effect the upward transfer of the particles through the lift pipe 81 to the separator 84.

Naptha feed is introduced into a heater 105 via the conduit 106, and the heated hydrocarbons are passed through the conduit 107 to the center of the reformer 89. The hydrocarbons are split into two streams in the reformer, one passing upwardly which is withdrawn through the conduit 108, and the other passing downwardly which is withdrawn through the conduit 109. The combined reformed streams are passed through a cooler 110 in the conduit 111 and separated into a liquid and gaseous stream in the separator 112. The liquid is withdrawn from the bottom of the separator and transferred through the conduit 113 to a fractionator not shown. The gas is taken overhead through the conduit 114 to an absorber 115. The reformed product is withdrawn from the absorber through the conduit 116. A portion of the product is recycled through the conduit 117, the conduit 118, heater 119, conduits 120 and 121 to the feed stream in conduit 107.

A portion of the recycle naphtha discharged from the heater 119 is taken through the conduit 122 to the top of the lift pot 82. The hot naphtha is passed downwardly through the bed of solids in the vessel 82 and effects a heat exchange with the solids. The solids are heated and the vapors are cooled. The vapors are withdrawn from the vessel through the conduit 123 and at least part of the withdrawn vapors are reintroduced through conduits 124 and 125 to provide primary and secondary streams of lift gas for effecting the upward transfer of the solids through the lift pipe 80 to the separator 85. Inasmuch as more gas is usually required to bring the solids up to the desired temperature level than is required to lift the particles through the lift pipe, the excess gas is taken through the conduit 118 and combined with the recycle stream in the conduit 117.

It is intended that the scope of this invention be considered broadly to cover all changes and modifications of the examples of the invention herein chosen for purposes of disclosure which do not constitute departures from the spirit of the invention.

I claim:

1. In a hydrocarbon conversion process in which a granular contact material is gravitated as substantially compact columns through reaction and reconditioning zones and the contact material is conveyed upwardly from beneath the reconditioning zone to the top of the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the two zones, introducing steam into the feeding zone in a controlled amount in excess of that sufficient to completely hydrate the contact material, withdrawing at least substantially all of the remaining steam from said feeding zone, conveying the hydrated contact material upwardly in a stream of the remaining steam through a laterally confined lift passage to a location above the reaction zone and gravitating the contact material downwardly from said location onto the top of the column in the reaction zone.

2. In a hydrocarbon conversion process in which a granular contact material is gravitated as substantially compact columns through reaction and reconditioning zones and the contact material is conveyed upwardly from beneath the reconditioning zone to the top of the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing more than enough steam to hydrate the contact material in said feeding zone and in direct heat exchange relationship with the contact material therein, withdrawing the excess steam not taken up by said contact material during hydration from said feeding zone and substantially immediately reintroducing at least a portion of the withdrawn steam into said feeding zone, so as to mix with contact material in the lower portion of said feeding zone and convey said contact material upwardly through a laterally confined lift passage to a location above the reaction zone.

3. In a hydrocarbon conversion process in which a granular contact material is gravitated as substantially compact columns through reaction and reconditioning zones and the contact material is conveyed upwardly from beneath the reconditioning zone to the top of the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing steam into said feeding zone at a rate in excess of that required to hydrate the contact material and in direct heat exchange relationship with the contact material therein, withdrawing excess steam from said feeding zone, substantially immediately reintroducing a portion of said withdrawn steam into said feeding zone as secondary lift gas, so as to travel through a substantial thickness of the bed of contact material before entering the lower end of an upwardly directed laterally confined lift passage which is terminated near the bottom of the feeding zone, substantially immediately reintroducing a second portion of the withdrawn steam into said feeding zone as primary lift gas, so as to pass directly into the lower end of the lift passage without again passing through any substantial thickness of contact material in the feeding zone, whereby the contact material is hydrated in the feeding zone and lifted upwardly through the lift passage to a location above the reaction zone.

4. In a hydrocarbon conversion process in which a granular contact material is gravitated as substantially compact columns through reaction and reconditioning zones and the contact material is conveyed upwardly from beneath the reconditioning zone to a location above the column in the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing steam into the upper end of said feeding zone at a rate in excess of that required to hydrate the contact material and in direct heat exchange relationship with the contact material therein, passing the steam downwardly through the compact bed of particles in said feeding zone, withdrawing excess steam from said feeding zone at a level a substantial distance above the bottom of said zone, substantially immediately reintroducing a portion of said withdrawn steam into said feeding zone as secondary lift gas at a level near the bottom of said zone, so as to travel through a substantial thickness of the bed of contact material before entering the lower end of an upwardly directed laterally confined lift passage which is terminated near the bottom of the feeding zone, substantially immediately reintroducing a second portion of the withdrawn steam into said feeding zone as primary lift gas, so as to pass directly into the lower end of the lift passage without again passing through any substantial thickness of contact material in the feeding zone, whereby the contact material is hydrated in the feeding zone and lifted upwardly through the lift passage to an elevated location for subsequent transfer to the top of the column in the reaction zone.

5. In a hydrocarbon conversion process in which a granular contact material is gravitated as substantially compact columns through reaction and reconditioning zones in an enclosed cyclic path and the contact material is conveyed upwardly from beneath the reconditioning zone to a location above the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing steam into said feeding zone at an intermediate level at a rate in excess of that required to hydrate the contact material and in direct heat exchange relationship with the contact material therein, passing the steam upwardly through the compact bed of particles in the feeding zone, withdrawing excess steam form the top of said feeding zone, substantially immediately reintroducing a portion of said withdrawn steam into said feeding zone as secondary lift gas at a level near the bottom of said zone so as to travel through a substantial thickness of the bed of contact material before entering the lower end of an upwardly directed laterally confined lift passage which is terminated near the bottom of the feeding zone, substantially immedaitely reintroducing a second portion of the withdrawn steam into said feeding zone as primary lift gas, so as to pass directly into the lower end of the lift passage without again passing through any substantial thickness of contact material in the feeding zone, whereby the contact material is hydrated in the feeding zone and lifted upwardly through the lift passage to an elevated location for subsequent transfer to the top of the column in the reaction zone.

6. In a hydrocarbon conversion process in which a granular contact material is gravitated as substantially compact columns through reaction and reconditioning zones and the contact material is conveyed upwardly from beneath the reconditioning zone to a location above the column in the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning zone and the feeding zone, said column being vented to the atmosphere at a level intermediate the ends thereof, introducing gas into the upper end of said feeding zone at a temperature substantially different from that of the contact material, passing the gas downwardly through and in direct heat exchange relationship with the contact material, so as to bring the temperature of the gas and the contact material to approximately the same level, withdrawing at least a substantial portion of the gas from the feeding zone at a level a substantial distance above the bottom of said zone, substantially immediately reintroducing a portion of said withdrawn gas into said feeding zone as secondary lift gas at a level near the bottom of said zone, so as to travel through a substantial thickness of the bed of contact material before entering the lower end of an upwardly directed laterally confined lift passage which is terminated near the bottom of the feeding zone, substantially immediately reintroducing a second portion of the withdrawn gas into said feeding zone as primary lift gas, so as to pass directly into the lower end of the lift passage without again passing through any substantial thickness of contact material in the feeding zone, whereby the contact material is lifted upwardly through the lift passage to an elevated location for subsequent transfer to the top of the column in the reaction zone.

7. In a hydrocarbon conversion process in which a granular contact material is gravitated as substantially compact columns through reaction and reconditioning zones and the contact material is conveyed upwardly in a stream of lift gas from beneath one of the zones to a level above the other zone in an enclosed cyclic path, the improvement which comprises: gravitating the contact material downwardly from one of the zones as a substantially compact column of restricted cross-section into the upper portion of a separate feeding zone, the length of the column being sufficient to prevent the flow of any substantial amount of gas between the reaction or reconditioning zone and the feeding zone, introducing a gas into said feeding zone at a temperature substantially different from the temperature of the contact material introduced into said zone, passing the gas through at least a substantial portion of the bed of contact material in said zone, so as to bring the temperature of the gas and contact material to approximately the same level, withdrawing at least a substantial portion of the gas from the feeding zone, and substantially immediately reintroducing at least a portion of the withdrawn gas into said feeding zone, so as to mix with the contact material in the lower portion of said zone and convey said contact material upwardly through a laterally confined lift passage to a location above the other of said zones for subsequent transfer into the upper portion of said other zone.

8. In a hydrocarbon conversion process in which a granular contact material is gravitated as substantially compact columns through reaction and reconditioning zones and the contact material is conveyed upwardly in a stream of lift gas from beneath one of the zones to a level above the other zone through an enclosed cyclic path, the improvement which comprises: gravitating the contact material downwardly from one of the zones as a substantially compact column of restricted cross-section into the upper portion of a separate feeding zone, the length of the column being sufficient to prevent the flow of any substantial amount of gas between the reaction or reconditioning zone and the feeding zone, introducing a gas into said feeding zone at a temperature substantially different from the temperature of the contact material introduced into said zone, passing the gas through at least a substantial portion of the bed of contact material in said zone, so as to bring the temperature of the gas and contact material to approximately the same level, withdrawing at least a substantial portion of the gas from the feeding zone, and substantially immediately reintroducing at least a portion of the withdrawn gas into the lower portion of said feeding zone as secondary lift gas, so as to travel through a substantial thickness of the bed of contact material before entering the lower end of an upwardly directed laterally confined lift passage which is terminated near the bottom of the feeding zone, substantially immediately reintroducing a second portion of the withdrawn gas into said feeding zone as primary lift gas, so as to pass directly into the lower end of the lift passage without again passing through any substantial thickness of contact material in the feeding zone, whereby the contact material is lifted upwardly through the lift passage to an elevated location for subsequent gravitation into the other zone.

9. In a hydrocarbon conversion process in which a granular contact material is gravitated as substantially compact columns through reaction and reconditioning zones in an enclosed cyclic path and the contact material is conveyed upwardly from beneath the reconditioning zone to a location above the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing gas into said feeding zone at an intermediate level at a temperature substantially different from the temperature at which the contact material is introduced into said zone, passing the gas upwardly in the feeding zone, withdrawing gas from the top of said feeding zone, substantially immediately reintroducing a portion of said withdrawn gas into said feeding zone as secondary lift gas at a level near the bottom of said zone, so as to travel through a substantial thickness of the bed of contact material before entering the lower end of an upwardly directed laterally confined lift passage which is terminated near the bottom of the feeding zone, substantially immediately reintroducing a second portion of the withdrawn gas into said feeding zone as primary lift gas, so as to pass directly into the lower end of the lift passage without again passing through any substantial thickness of contact material in the feeding zone, whereby the contact material is lifted upwardly through the lift passage to an elevated location for subsequent transfer to the top of the column in the reaction zone.

10. In a reforming process in which a granular reforming catalyst is gravitated as substantially compact columns through reaction and reconditioning zones in a cyclic flow path and the catalyst is conveyed upwardly from beneath the reconditioning zone to a location above the column in the reaction zone in a stream of lift gas, the improvement which comprises: gravitating the contact catalyst downwardly from the reconditioning zone as a substantially compact column of restricted cross-section into the upper portion of a separate feeding zone, the length of the column being sufficient to prevent the flow of any substantial amount of gas between the reconditioning zone and the feeding zone, said column being vented to the atmosphere at a level intermediate the ends thereof, introducing naphtha feed into the upper end of said feeding zone at a temperature substantially above that of the contact material, passing the gas downwardly in the feeding zone at a flow rate substantially in excess of that required for lifting the solid material, so as to raise the temperature of the catalyst to a level somewhat above that required for reaction in the reaction zone, withdrawing at least a substantial amount of the naphtha from the feeding zone at a level a substantial distance above the bottom of said zone, substantially immediately reintroducing a portion of said withdrawn naphtha into said feeding zone as secondary lift gas at a level near the bottom of said zone, so as to travel through a substantial thickness of the bed of contact material before entering the lower end of an upwardly directed laterally confined lift passage which is terminated near the bottom of the feeding zone, substantially immediately reintroducing a second portion of the withdrawn naphtha into said feeding zone as primary lift gas, so as to pass directly into the lower end of the lift passage without again passing through any substantial thickness of contact material in the feeding zone, whereby the contact material is conveyed upwardly to a separating zone above the reaction zone for subsequent transfer into the upper portion of the reaction zone.

11. In a hydrocarbon conversion process in which a granular contact material is gravitated as substantially compact columns through reaction and reconditioning zones and the contact material is conveyed upwardly from a level beneath the reconditioning zone to a level above the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing steam into said feeding zone at a rate in excess of that required to hydrate the contact material and at a temperature substantially different from that at which the contact material is introduced into said zone, withdrawing excess steam above that required for hydration of the contact material after passage through a substantial portion of the bed of contact material in said feeding zone, substantially immediately reintroducing a portion of the withdrawn steam into the lower portion of said feeding zone as secondary lift gas, so as to travel through a substantial thickness of the bed of contact material before entering the lower end of an upwardly directed laterally confined lift passage which is terminated near the bottom of the feeding zone, substantially immediately reintroducing a second portion of the withdrawn steam into said feeding zone as primary lift gas, so as to pass directly into the lower end of the lift passage without again passing through any substantial thickness of contact material in the feeding zone, whereby the contact material is hydrated and the gas temperature is brought to about that of the contact material and then the contact material is lifted upwardly through the lift passage for subsequent gravitation into the reaction zone.

12. In a hydrocarbon conversion process in which a granular contact material is gravitated as substantially compact columns through reaction and reconditioning zones and the contact material is conveyed upwardly from a level beneath the reconditioning zone to a level above the reaction zone in a stream of lift gas, the improvement which comprises: gravitating the contact material downwardly from the reconditioning zone as a substantially compact column of restricted cross-section into the upper portion of a separate feeding zone, the length of the column being sufficient to prevent the flow of any substantial amount of gas between the reconditioning and feeding zones, said column being vented to the atmosphere at a level intermediate the ends thereof, introducing steam into the top of said feeding zone at a rate in excess of that required to hydrate the contact material and at a temperature substantially different from that at which the contact material is introduced into said zone, passing the steam downwardly through a substantial thickness of a bed of contact material in the feeding zone, so as to completely hydrate the contact material and bring the temperature of the gas and solids to approximately the same level, withdrawing excess steam above that required for hydration of the contact material at a level intermediate the top and bottom of the feeding zone, substantially immediately reintroducing a portion of the withdrawn steam into the lower portion of said feeding zone as secondary lift gas, so as to travel through a substantial thickness of the bed of contact material before entering the lower end of an upwardly directed laterally confined lift passage which is terminated near the bottom of the feeding zone, substantially immediately reintroducing a second portion of the withdrawn steam into said feeding zone as primary lift gas, so as to pass directly into the lower end of the lift passage without again passing through any substantial thickness of contact material in the feeding zone, whereby the hydrated contact material is lifted smoothly through the lift passage for subsequent gravitation into the reaction zone.

13. A gas lift for pneumatically raising granular contact material in a hydrocarbon conversion system in which a solid granular contact material is gravitated downwardly as substantially compact columns through reaction and regeneration vessels and continuously transferred from the bottom of one vessel to the top of the alternate vessel which comprises in combination: a vertically elongated feeding vessel of circular cross-section, a solids transfer conduit of restricted cross-section attached to the top of the vessel through which contact material is gravitated from the bottom of one of the vessels into the top of the feeding vessel in the form of a compacted mass, said conduit being vented to the atmosphere at an intermediate level, a vertically extended, open-ended lift passageway projected downwardly into the feeding vessel in a concentric location and terminated in the lower portion of the vessel, a multiplicity of dish-shaped ring baffles located concentric with the lift passageway one above the other in the middle portion of the vessel with at least the top baffle connecting with the inner wall of the vessel, so as to provide a region free of contact material therebelow through which a lift gas can be introduced into the contact bed, a conduit attached to said feeding vessel connecting with said region, for the introduction of lift gas into the vessel, a horizontally located restricting baffle located below the ring baffles but above the bottom end of the lift passageway, said restricting baffle possessing depending conduits distributed across its surface to provide for the downward transfer of the contact material, a discharge conduit attached to the top of the vessel above the level of the bed of contact material therein, adapted to receive the lift gas and carry it downwardly to the bottom portion of the vessel, primary and secondary gas conduits attached to said discharge conduit, said primary conduit projected upwardly into the bottom of the vessel and terminated near the bottom of the lift passageway, said secondary conduit attached to the lower portion of said vessel, a circular manifold located in the bottom of the vessel in communication with said secondary conduit, said manifold arranged to provide an annular stream of contact material about the lower end of the lift passageway, means defining orifices in the manifold through which lift gas is introduced into the annular stream of contact material, valves in the primary and secondary gas conduits, whereby the contact material is lifted smoothly upward through the lift passageway to a location above the other vessel, to maintain the contact material in continuous circulation.

References Cited in the file of this patent
UNITED STATES PATENTS

| | | |
|---|---|---|
| 1,339,977 | Pruden | May 11, 1920 |
| 2,509,983 | Morrow | May 30, 1950 |
| 2,561,409 | Ardern | July 24, 1951 |
| 2,561,771 | Ardern | July 24, 1951 |
| 2,587,670 | Weinrich | Mar. 4, 1952 |
| 2,616,521 | Berg | Nov. 4, 1952 |
| 2,661,321 | Schutte | Dec. 1, 1953 |
| 2,666,731 | Bergstrom | Jan. 19, 1954 |
| 2,694,036 | Meyers | Nov. 9, 1954 |